UNITED STATES PATENT OFFICE.

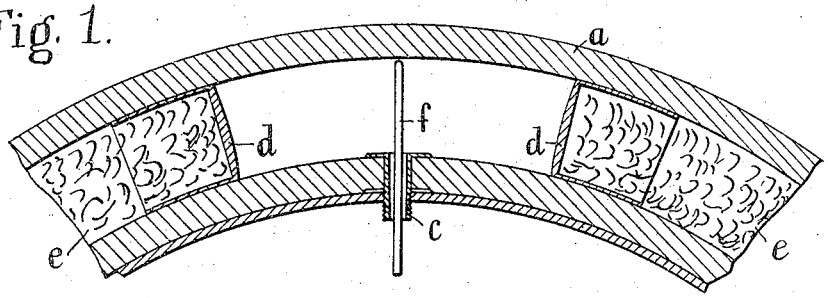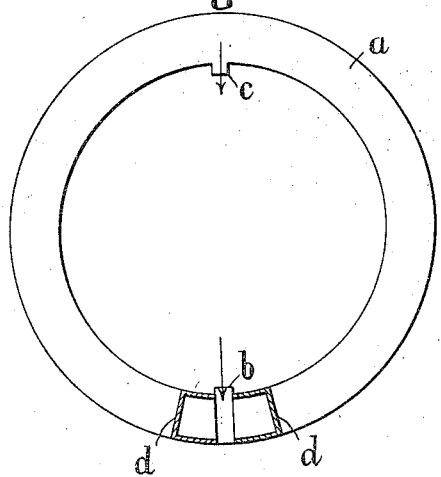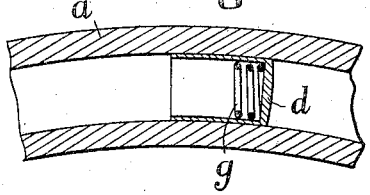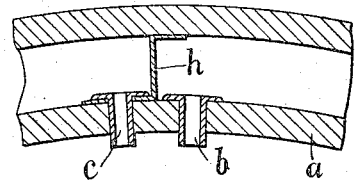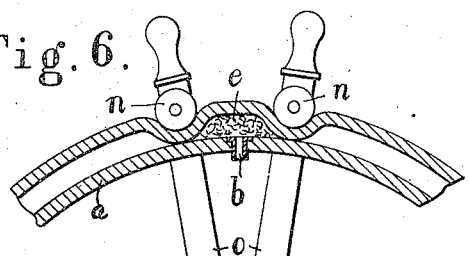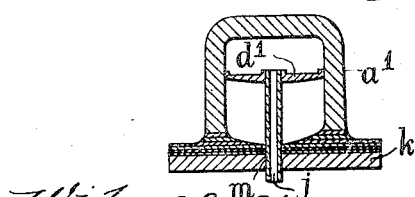

ARTHUR THOMAS COLLIER, OF ST. ALBANS, ENGLAND, ASSIGNOR TO PFLEUMATIC SYNDICATE, LIMITED, OF LONDON, ENGLAND, A SYNDICATE OF GREAT BRITAIN.

METHOD OF FILLING HOLLOW ELASTIC VEHICLE-TIRES WITH SPONGY MATERIAL.

No. 917,545.     Specification of Letters Patent.     Patented April 6, 1909.

Application filed January 26, 1909. Serial No. 474,314.

*To all whom it may concern:*

Be it known that I, ARTHUR THOMAS COLLIER, a subject of the King of Great Britain, residing at St. Albans, England, have invented new and useful Improvements in Methods of Filling Hollow Elastic Vehicle-Tires with Spongy Material, of which the following is a specification.

My invention relates to elastic vehicle-tires of the kind in which there is a hollow elastic or flexible chamber or chambers filled with a spongy or foamy gelatinous substance, the cells of which contain compressed gas, such for example, as described in the specification of British Letters Patent No. 3,314 of 1906. In some of the tires of this kind heretofore constructed, the sponge or foam containing gas under pressure has been forced into canvas bags or casings which have afterward been inclosed in the outer covers of pneumatic tires in place of the air-tubes thereof. This arrangement is open to the disadvantage that, before the tire has been used on the road, practically the whole of the stretch has been taken out of the canvas forming the said bags or casings by the pressure of the sponge or foam forced therein; while the canvas insertion in the outer cover is practically unstretched. The consequence of this state of things is that, after the tire has been in use for some time, the outer cover stretches and thus causes a space to be left between its inner surface and the bag or casing filled with the said sponge or foam. This space permits relative motion to take place during running between the parts of the tire which gives rise to frictional heating and rapid wear. Moreover the use, in an elastic tire, of an additional bag or lining of canvas as above mentioned, impairs the resiliency of said tire and increases the cost and weight thereof. Moreover it has already been suggested to introduce the said sponge or foam directly into the air-tube of an ordinary pneumatic tire, the interior of said tube having the air pumped out before the sponge or foam is forced in. This arrangement has not been found satisfactory in practice by reason of the collapsing of the air-tube and for the reason that the first portions of the sponge or foam entering the exhausted space have their cellular structure destroyed by the expansion of the air contained therein by reason of the sudden release of the external pressure.

Now according to the present invention, I provide a single-tube tire, or an outer cover preferably provided with overlapping basal portions or a hollow tire section, each of the above being made either with or without canvas insertion, filled with the aforesaid sponge or foam. According to one method, the filling is effected against a supporting pressure produced by a movable piston or diaphragm arranged between the sponge or foam and a liquid in the interior space of the tire or tire-section, which liquid is allowed to escape through a constricted aperture at one end of the said interior space, while the sponge or foam is forced in through an aperture at the other end of the said space. In some cases, the requisite supporting resistance may be provided solely by the friction of the piston moving along the interior wall of the tire or tire-section, the liquid in this case being dispensed with. The said piston may be formed of canvas which is preferably waterproof and provided with a tubular rearwardly-extending wall which is pressed against the wall of the interior space of the tire by the pressure of the sponge or foam on its interior surface, the said piston being preferably removed through the outlet aperture when said interior space is filled with the sponge or foam. In the case of sectional tires, the sections of which are mounted on rigid carriers, the pistons may be made more or less rigid with packing at their edges and be arranged to move toward the rigid carrier against which they may be allowed to remain permanently after the section has been filled with sponge or foam. The inlet pipe may be passed through an aperture in said piston so as to move fluid-tight therein or it may be fixed to said piston and move outward as the section is filled with the sponge or foam. In cases where the tire or tire-section has sufficiently flexible walls, for example, for tires for bicycles, motor-cycles and small cars, the requisite resistance may be produced by pressing rollers against the exterior surfaces thereof, these rollers being rolled at a suitable speed in advance of the sponge or foam as the latter is forced in.

In the accompanying drawing, I have shown how the said invention may be conveniently and advantageously carried into practice.

Figure 1 is a median section of a single-tube tire showing the pistons approaching each other toward the completion of the filling process, and Fig. 2 is a diagram showing the position of the pistons at the commencement of the filling process. Fig. 3 is a similar view to Fig. 1, showing a piston having an internal supporting spring. Fig. 4 is a similar view to Fig. 1, illustrating a modified arrangement of the inlet and outlet of the tire. Fig. 5 is a transverse section of a hollow element or section of a sectional tire, showing the means for filling the same. Fig. 6 is a diagram illustrating a modified method of filling a continuous or endless tire.

In filling an endless tire, according to the method shown in Figs. 1 and 2, the tire $a$ is provided with an inlet aperture $b$ and a diametrically-opposite outlet aperture $c$, of sufficient size to permit the insertion and removal of the hollow pistons $d$, $d$, which are preferably arranged on opposite sides of the inlet aperture $b$, as illustrated in Fig. 2. The filling material $e$ is caused to enter the tire and move the pistons $d$, $d$ in front of it, as shown in Fig. 1, and, in order to prevent the outlet $c$ from being prematurely closed by one of the pistons, in the event of such piston moving faster than the other, a rod $f$ is inserted into the outlet $c$ so as to extend into the fairway of the tire and arrest the motion of said faster moving piston and thus permit the escape of the air or other fluid in the tire in front of the more slowly moving piston.

In Fig. 3 a canvas piston is shown which is kept extended by an internal spring, e. g. a coil of steel or other elastic wire $g$, which may be also withdrawn through the outlet aperture. This spring may have inwardly bent, rounded or ball-shaped ends to prevent it from damaging the tire as it is withdrawn.

In Fig. 4, an arrangement is illustrated in which the inlet and outlet apertures $b$, $c$ are arranged close together with a flexible diaphragm $h$ between them. This diaphragm may consist of canvas permanently secured in the interior of the tire as shown, or it may be made with a suitable supporting frame whereby it may be detachably secured in said tire. In this arrangement, the single piston is employed which moves around the interior of the tire in front of the filling material from the inlet $b$ to the outlet $c$.

In the sectional tire element $a'$ shown in Fig. 5, the piston $d'$ has an inlet pipe $j$ for filling material secured therein, so that the filling material is delivered to the farther side of said piston and forces the latter down on to the rigid base or carrier $k$ of the tire element, where it may be allowed to remain permanently. The inlet pipe $j$ extends through a hole $m$ in the carrier $k$, this hole being preferably closed by a suitable plug or the like after removal of the pipe $j$.

In Fig. 6, an arrangement is shown in which rollers $n$, $n$ are rotatably mounted on arms $o$, $o$ which are adapted to turn about an axis $p$ arranged concentrically with the tire $a$. These rollers, on commencing to fill the tire, are arranged close together; as the filling material $e$ enters, it causes them to move in front of it in opposite directions around the tire until they meet at the outlet for the air or other fluid originally in the tire.

When it is desired to produce a high pressure in the tire, suitable means may be provided for constricting the outlet aperture $c$, so as to limit the rate at which the air or other fluid originally in the tire can escape.

I claim:

1. A method for filling hollow vehicle tires with spongy material, which consists in forcing a column of spongy material under pressure into the hollow chamber of the tire and in providing movable mechanical means for closing the fairway of said hollow chamber immediately in front of said column of spongy material.

2. A method for filling hollow vehicle tires with spongy material which consists in forcing spongy material under pressure into the hollow chamber of said tire and closing the fairway of the hollow chamber of the tire by mechanical means at successive points along said chamber during the operation of introducing the spongy material thereinto.

3. A method for filling hollow vehicle tires with spongy material which consists in forcing spongy material under pressure into the hollow chamber of the tire and producing an internal bulging of the wall of the tire section at successive points along said chamber during the operation of introducing spongy material thereinto.

4. A method for filling hollow vehicle tires with spongy material which consists in forcing a column of spongy material under pressure into the hollow chamber of the tire and in providing a roller movable about the periphery of the tire for causing an internal bulging thereof at successive points along the fairway of the hollow chamber.

5. A method for filling hollow vehicle tires with spongy material which consists in forcing a column of spongy material under pressure into the hollow chamber of the tire, separating the spongy material from the column of air in advance thereof and causing the advancing column of spongy material to move the separating means and through the agency of the latter to expel the aforesaid column of air from the chamber of the tire.

ARTHUR THOMAS COLLIER.

Witnesses:
GEORGE HARRISON,
GEORGE DONALD HARRISON.